W. A. BONE, J. W. WILSON & C. D. McCOURT.
STEAM GENERATION, FEED WATER HEATING, AND HEATING OF LIQUIDS GENERALLY.
APPLICATION FILED DEC. 3, 1910.

1,015,261.

Patented Jan. 16, 1912.

3 SHEETS—SHEET 1.

WITNESSES
W. P. Burke
John C. Sanders

INVENTORS
William A. Bone,
James W. Wilson,
Cyril D. McCourt

W. A. BONE, J. W. WILSON & C. D. McCOURT.
STEAM GENERATION, FEED WATER HEATING, AND HEATING OF LIQUIDS GENERALLY.
APPLICATION FILED DEC. 3, 1910.

1,015,261.

Patented Jan. 16, 1912.

3 SHEETS—SHEET 2.

WITNESSES
W. P. Burke
John C. Sanders

INVENTORS
William A. Bone
James W. Wilson
Cyril D. McCourt

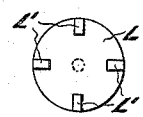
Fig. 6.  Fig. 7.
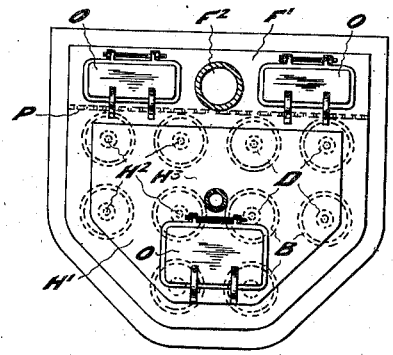
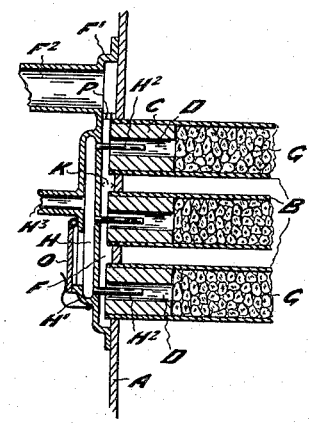
Fig. 9.  Fig. 8.

UNITED STATES PATENT OFFICE.

WILLIAM ARTHUR BONE AND JAMES WILLIAM WILSON, OF LEEDS, AND CYRIL DOUGLAS McCOURT, OF LONDON, ENGLAND.

STEAM GENERATION, FEED-WATER HEATING, AND HEATING OF LIQUIDS GENERALLY.

1,015,261.   Specification of Letters Patent.   Patented Jan. 16, 1912.

Application filed December 3, 1910. Serial No. 595,438.

*To all whom it may concern:*

Be it known that we, WILLIAM ARTHUR BONE, of the University, Leeds, in the county of York, professor of applied chemistry, JAMES WILLIAM WILSON, of Carlton Works, Armley, Leeds, in the said county, gas-stove manufacturer, and CYRIL DOUGLAS McCOURT, of 13 Malwood road, Balham Hill, London, S. W., England, chemist, subjects of the King of Great Britain and Ireland, have invented new and useful Improvements in and Relating to Steam Generation, Feed-Water Heating, and the Heating of Liquids Generally, of which the following is a specification.

This invention relates to improvements in steam generation, feed water heating and the heating of liquids generally by the heat resulting from gaseous combustion, our principal objects being to utilize for the purpose in view, as large a proportion as possible of the available heat produced, and at the same time to transmit a large proportion of heat per unit area of heating surface.

In describing our invention in detail reference is made to the accompanying sheets of drawings, similar letters indicating similar parts, in which—

Figure 1:
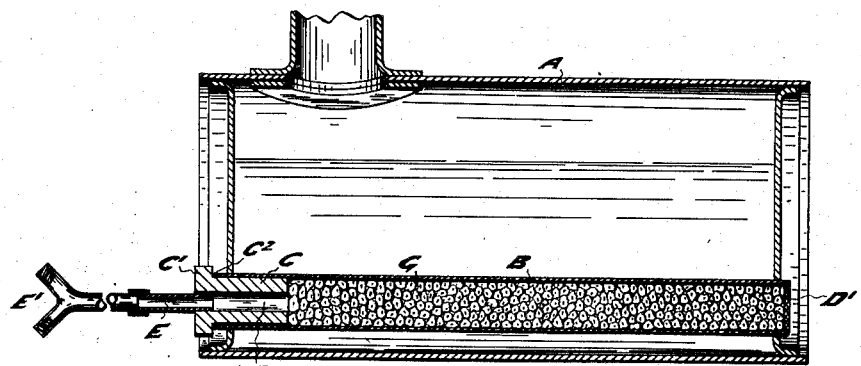
Figure 1A:
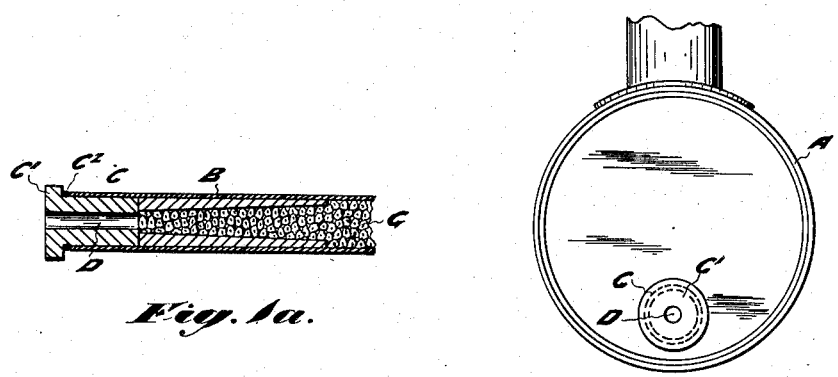
Figure 2:
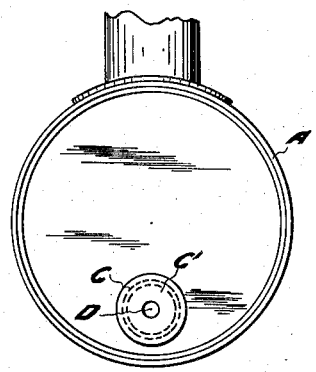
Figure 3:
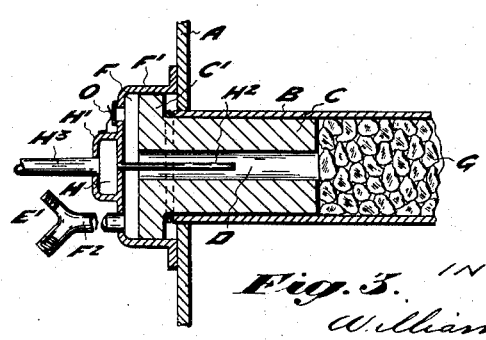
Figure 4:
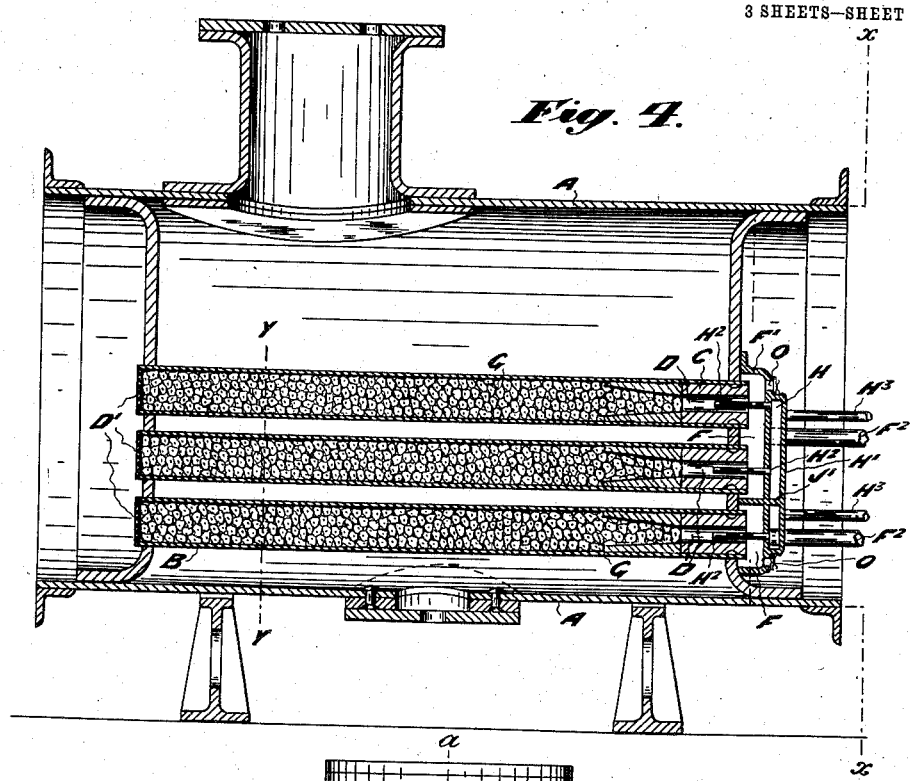
Figure 5:
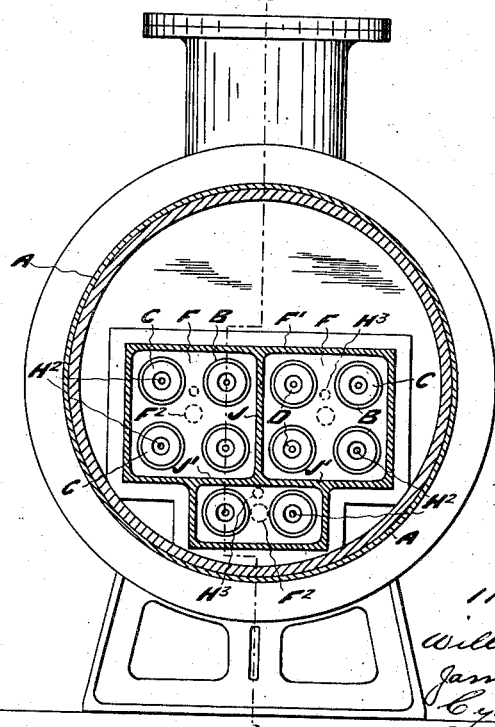

Figure 1 represents a sectional elevation of a steam generator constructed according to our invention. Fig. 1ª represents a detail hereinafter referred to. Fig. 2 represents a front elevation of Fig. 1. Fig. 3 represents a detail of a feed device. Figs. 4 and 5 represent sectional elevation and end view respectively of another form of generator, Fig. 5 being a section plane $x$—$x$ of Fig. 4, the section line of Fig. 4 being shown at $a$—$b$ in Fig. 5. Figs. 6 and 7 represent details of a tube charging device hereinafter referred to. Figs. 8 and 9 represent sectional elevation and front view respectively of an arrangement for firing a ten tube boiler.

In carrying out our invention we may employ coal gas, coke oven gas, producer gas, blast furnace gas, aerated petrol, natural gas, or other combustible gas or vapor or mixture thereof amenable to our method of procedure, such gas or vapor or mixture thereof being hereinafter designated the combustible gas. According to this invention a mixture of such combustible gas and of air or other available supporter of combustion may be made preferably in substantially the proportions theoretically required for complete combustion or with some excess of air thereover, although of course the proportions of the constituent gaseous materials may vary considerably and still secure an explosive mixture, that is, one capable of explosive combustion or inflammation possibly under conditions of increased pressure and temperature. Such mixtures may be passed into a bed or beds of refractory granular material packed or charged in a tube or tubes, traversing the body of liquid to be heated and at a pressure sufficient to overcome the resistance to gaseous flow exercised by the granules and at such a speed that back ignition of the mixture is prevented. In order to prevent clogging of the granular beds the gases employed should be substantially free from dust and to this end may be washed or otherwise cleaned. In cases where a gas of low heating power is water washed when hot, as for example producer gas, the steam content must not be such as will interfere with its combustion in the granular bed.

We will first describe our invention as applied to a small steam generator comprising a cylindrical shell traversed by a single tube packed with granular material, shown in Figs. 1 and 2. A is the boiler shell. B is the tube closed at one end by a fire clay or other suitable plug C provided with an aperture D for the introduction of the gaseous mixture, the head C' of plug C by preference is enlarged and projects somewhat from the tube B and a tight joint may be made at $C^2$ by winding the plug with asbestos string plastered with white lead or the like prior to insertion in the tube, or a groove may be made around the plug for the reception of asbestos or like packing. The said tube B is packed with suitable fragments of refractory granular material G, such for instance as fire brick crushed to such a size as will pass a sieve of one mesh to the linear inch, and having the finer material such as will pass a sieve of two meshes to the linear inch taken out. The material G is retained at the exit end of the tube B by means of a stout gauze or the like D'. At the inflow end of a layer of pieces of a larger size may be used in order to prevent choking of the gas inflow tube. The diameter of the aperture D of plug C must not be so great as to allow the gaseous mixture to fire back and burn therein, and we have found a diameter of ⅝ of an inch to be suitable for this object when admitting a gaseous mixture of coal gas and air at the rate of about 100 cubic feet of coal gas per hour with its necessary air. The gaseous mixture is conveyed to the central aperture D by means of a pipe E, the joint being rendered air tight in any usual or convenient manner. Air and combustible gas both under pressure are supplied to pipe E from a Y piece or like E', the two supplies being controlled by suitable valves. Each pipe is preferably furnished with a non-return valve. The gas and air will mingle on meeting in the Y piece and will mix thoroughly in passing down pipe E and aperture D provided that the combined length of run is not too short. We have found a length of run of a foot to be sufficient. In general, the method of starting up this generator will be to first turn on one constituent of the gaseous mixture, apply a light to the exit end of tube B and then slowly turn on the other constituent until the resulting flame travels back through the bed of granules and combustion proceeds near the entrance end thereof, thus raising the granules in the zone of combustion to a state of incandescence. The gas and air supplies are best adjusted so that a slight excess of oxygen is found in the products, in order to secure complete combustion of the combustible gas. If the tube B is of too great diameter, the heat developed at the hottest point may not pass away with sufficient rapidity, with the result that the granular material may be softened. When using coal gas we have found that with an internal diameter of 3 inches, fire-clay packing may be employed without material softening, while with an internal diameter of 4 inches granules of fire-clay situated in the hottest zone are liable to become softened. In this case the core of granular material at the hottest region should consist or carborundum or other very highly refractory material. Where however the combustible gas is of low calorific intensity, as for example blast furnace gas, this precaution is not necessary. In order to distribute the flow of heat more evenly along the tube, it is desirable in some cases to line the tube with refractory material for a portion of its length near the hottest point to secure the desired distribution. Fig. 1ª shows a tube having a sleeve or bushing of fire-clay inserted in the tube near the end at which the gaseous mixture enters. This sleeve may be made tapering, having the thickest portion of the wall near the hottest point. As the partial prevention of the radiant out-flow of heat will cause the core of granular material to be more highly heated, carborundum or other equivalent material should be used at this point. The most suitable length of tube or tubes B to employ will depend, on the diameter thereof, on the calorific intensity of the gas employed, on the rate of consumption of the gas, and on the temperature at which it is desired that the products of combustion should leave the generator. And in general it will be found that this invention lends itself to the construction of boilers provided with tubes shorter than those usually employed. For example, we have found that when burning coal gas, or coke oven gas at the rate of 100 cubic feet per hour per tube, the tube or tubes may conveniently be 3 feet long and 3 inches internal diameter. The gas and air under pressure may be supplied by any suitable blower or compressor so long as the pressure is such as will supply the tube or tubes with gaseous mixture at such a speed as to prevent back firing through the aperture D of the plug C. The pressure will vary under different conditions and with different gaseous mixtures and should be kept as uniform as possible. With coal gas we have worked satisfactorily with a gaseous mixture at pressures of from 10 to 30 inches water gage.

In order to give some idea of the high heat transfer obtainable by this invention we give the following instance, which relates to a horizontal boiler tube 3 feet long (Fig. 1.) and of 3 inches internal diameter, a fire-clay plug projecting 4 inches into one end thereof and the remainder of the tube being packed with crushed fire brick of such a size as will pass a sieve of one mesh to the linear inch but will not pass a sieve of two meshes to the linear inch. We have found that when burning in this packed tube a gaseous mixture of coal gas and air such that only a trace of oxygen was found in gas being about 560 B. Th. U. per c. ft.), the products of combustion when the gas consumed was at the rate of 100 c. ft. per hour (the net calorific value of the coal gas being about 560 B. Th. U. per c. ft.), the products of combustion issue from the end of the tube at the following temperatures dependent on the temperature of the surrounding water:—

| Temperature of water. | Steam pressure. | Temperature of product. |
|---|---|---|
| 100° C. | 0 lbs. ▢ ″ | 219° C. |
| 148° C. | 50 lbs. ▢ ″ | 251° C. |
| 170° C. | 100 lbs. ▢ ″ | 266° C. |

We have further found that in the first mentioned case where the water was boiling at 100° C, about 90% of the total heat available from the gas was transmitted to the water.

When this invention is employed for the heating of liquids other than water, regard must be had to the high heat transfer produced, and the nature of the liquid heated must not be such as to interfere with the free flow of heat from the tube surface to the liquid (as for example by depositing a scale or crust on the tubes) nor such as to corrode the tubes.

In some cases we have found a difficulty in starting owing to the liability of the flame in running back through the granular bed to shoot through the aperture in the fire clay plug. We have found the device shown in Fig. 3 greatly reduces the risk of such back firing. In this device B is the tube, C the fire clay or like plug. F is a chamber formed by a casing F' to which may be added a casting H' forming another chamber H from which a pipe $H^2$ of narrow bore leads to the plug C and into aperture D therein. The chamber H is supplied with gas from a suitable pipe such as $H^3$ and to chamber F by means of pipe $F^2$ is admitted the gaseous mixture or air alone. The chambers H and F should be as small as is practicable and where a single tube is dealt with the chamber H may be discarded the pipe $H^3$ in such case being made continuous with $H^2$. In starting firing, air alone is first admitted into chamber F and passes through the plug C and tube B. Combustible gas is then admitted to chamber H and passes thence to tube B, a flame being applied to the exit end of said tube, the air or combustible gas as the case may be being increased until the flame strikes back and combustion proceeds in the bed of granules. After a few minutes when the granules near the plug C will have become incandescent the supply of combustible gas to chamber H is shut off and combustible gas turned on to mix with the air which is being supplied to the chamber F.

Where the gas employed is of low heating power, as for instance, blast furnace gas, and the flame produced at the exit end of the tube or tubes cannot be made to strike back through the granular bed, the generator may be first started up on coal gas, aerated petrol vapor or other gas or vapor amenable to the method last described, and such gas or vapor subsequently turned off and the poorer gas turned on to mix with the air supplied to chamber F.

The directions hereinbefore given for the construction of a steam generator carrying a single tube will apply equally to a generator of many tubes, but where one chamber feeds more than one tube with gaseous mixture the tendency to fire back is increased and suitable means of supplying a gaseous mixture to the tubes to overcome this tendency should be employed.

In Figs. 4 and 5, representing sectional elevation and end view of a boiler constructed in accordance with our invention, we have shown a ten tube boiler adapted to be fired by coal or coke oven gases. The tubes B at their entrance end are inclosed by a casing or casings such as H and F arranged with their pipes substantially as hereinbefore described with reference to Fig. 3, and these casings which are suitably attached to the boiler are divided into three, by means of partitioned walls J, J', (Fig. 5) and each casing will have its own supply pipes. It will be seen in Fig. 5 that the tubes are in groups, two of four and one of two, and we prefer that the gaseous mixture pipes $F^2$ should be arranged in the centers of the groups to insure a substantially symmetrical feed.

Any water condensed from the products of combustion before the granular material has become heated throughout should be allowed to drain away.

Where a generator is arranged with its tubes in groups certain advantages will accrue in that one or more groups of tubes may be used when less steam or power is required. Thus in the example given in Figs. 4 and 5, 2, 4, 6, 8 or 10, tubes may be in use as required.

The chambers to which the gaseous mixture is admitted should be supplied with explosion doors such as O and same may be of any suitable or usual pattern, as for example a hinged door retained against its seating by means of a spring so arranged that on any explosion taking place in the chamber the door would open.

We have found that the liability to back fire through the fire clay plug increases with the volume of gaseous mixture inclosed in the feeding chamber, and hence it is desirable that the dimensions of the feeding chamber should be kept as small as possible consistently with the proper distribution of the gaseous mixture to the tubes. This is particularly the case when dealing with high grade gases having a relatively high rate of ignition such as coal gas, and is less so in the case of low grade gases such as blast furnace gas. We have succeeded (using coal gas) in firing the ten tubes of the steam generator shown in Figs. 4 and 5 from a single feeding chamber shown in Figs. 8 and 9 by restricting the dimension K in Fig. 8 to three quarters of an inch, the boiler tubes projecting from three eighths of an inch to one half inch beyond the end plate of the boiler into the feeding chamber. We have found that twenty inches water gage is a sufficient pressure at which to supply the air when admitting coal gas to mix therewith after the granules have been initially heated by means of the starting device hereinbefore described. If these dimensions be exceeded it will probably be found that a higher pressure will be required in order to prevent back firing.

The mixture enters the chamber F immediately above a perforated partition or the like P through which the mixture streams to the tubes. In order to insure a fairly evenly distributed supply we prefer that the total area of the perforations in the partition is less than the area of the cross section of the supply pipe.

Instead of employing granular material as hereinbefore described fire clay balls or the like may be employed.

The waste products of combustion may be utilized by passing or drawing same through return pipes or in any suitable manner.

With regard to the packing of the tubes with granular refractory material, when such tubes are arranged vertically same may be evenly packed by merely dropping the granules therein, but where the tubes are arranged horizontally as in the figures this method will not apply. In order to pack the tube evenly we use a special tool, (see Figs. 6 and 7) comprising a disk L having fingers or projections L' near its periphery the disk being mounted on a convenient handle. The granular material is placed in the tube and pushed home by the disk, a rotatory or semi-rotatory motion being given thereto. This action is continued until the tube is filled.

We have described our invention with reference to the heating of steam boilers, but it is obvious that the same arrangements may be applied to feed-water heating and the heating of liquids generally, and we wish it to be understood that all such applications are within the scope of our invention. It is also obvious that the combustion tubes may be placed in inclined or vertical positions. For instance, referring to Fig. 4, if the shell were placed vertically on its right hand end with the gas feed below, the water level would assume some such position as that represented by the dotted line Y—Y. In this case if say 95% of the heat utilized passed directly into the water below the water line the remaining 5% would be utilized for superheating in the steam space above Y—Y. It is also obvious that the form of our apparatus is capable of considerable variation without affecting its principles of action.

What we claim as our invention is:—

1. A boiler comprising a liquid receptacle, a body of refractory material, means for protecting said refractory material from contact with the liquid and means for directing into contact with said refractory material an explosive gaseous mixture.

2. A boiler comprising a liquid reservoir, a body of granular refractory non-metallic material therein, means for protecting said refractory material from contact with the liquid and means for directing an explosive gaseous mixture into said refractory material.

3. A boiler comprising a liquid reservoir, a tube therein, refractory non-metallic material in said tube and means for directing against said refractory material an explosive gaseous maxture of combustible gas and of supporter of combustion therefor in substantially the proportions required for complete combustion.

4. A boiler comprising a liquid reservoir, a tube extending therethrough, granular refractory material within said tube throughout part of its length and means for passing an explosive gaseous mixture into the tube and effecting combustion thereof within said refractory meaterial.

5. A boiler comprising a liquid reservoir, a metallic tube extending therethrough, granular refractory material filling said tube throughout part of its length and means for passing into said tube an explosive gaseous mixture of combustible gas and supporter of combustion therefor in substantially the proportions required for complete combustion.

6. A boiler comprising a liquid reservoir, a tube extending therethrough, granular refractory non-metallic material within said tube and means for passing into contact with said refractory material an explosive gaseous mixture and effecting the substantially complete combustion of said gaseous mixture within said refractory material in part of said tube and cooling the heated combustion gases by forcing them through another portion of said refractory material.

7. A boiler comprising a reservoir, a tube filled with refractory material extending therethrough, a perforated refractory plug at one end of said tube and a gas nozzle extending into said plug.

8. A boiler comprising a reservoir, a tube extending therethrough, granular refractory non-metallic material within said tube, a perforated refractory plug adjacent one end of said tube and a gas nozzle coöperating with said plug.

9. A boiler comprising a reservoir, a tube containing porous refractory material extending therethrough, a perforated plug at one end of said tube, a gas nozzle extending into said plug and a meshed cap at the end of said tube opposite to said plug.

10. A boiler comprising a reservoir, a plurality of separate bodies of refractory material therein, means for protecting said refractory material from the liquid normally contained in said reservoir and separate means for directing against said bodies of refractory material streams of explosive combustible gas and of supporter of combustion therefor, in proportions allowing substantially complete combustion.

11. A boiler comprising a reservoir, a plurality of tubes extending therethrough, each containing granular refractory material, and separate means including a separate gas nozzle communicating with each of said tubes for supplying an explosive gaseous mixture to certain of said tubes independently of others.

12. A boiler comprising a reservoir, a plurality of tubes extending into said reservoir, each of said tubes containing granular refractory material, and separate means for supplying an explosive gaseous mixture to certain of said tubes independently of others.

13. A boiler comprising a reservoir, a plurality of tubes extending into said reservoir, each of said tubes containing refractory material comprising porous non-metallic combustion accelerating material, heads communicating with said tubes at one end thereof and connecting them together into groups and separate means for supplying an explosive gaseous mixture to each of said groups of tubes.

14. A boiler comprising a reservoir, a tube containing granular refractory material extending into said reservoir and means for directing into contact with said refractory material an explosive mixture of combustible gas and air to effect accelerated combustion in connection with the granular material in part of said tube, and means to cool the combustion gases to temperatures approaching the temperature of the liquid by passing them through additional granular material.

15. A boiler comprising a reservoir, a tube extending therethrough, granular refractory non-metallic material filling said tube throughout part of its length, a perforated refractory plug at one end of said tube, a highly refractory tapering bushing in said tube beyond said plug and means to direct an explosive gaseous mixture through said plug.

16. A boiler comprising a reservoir, a tube extending therethrough, granular refractory material within said tube throughout part of its length, a perforated refractory plug at one end of said tube, a highly refractory tapering bushing in said tube beyond said plug, highly refractory material within said bushing and the adjacent part of said tube and means for directing an explosive gaseous mixture into said plug so as to normally prevent back firing.

17. A liquid heating apparatus comprising a reservoir, a tube in said reservoir, granular refractory material comprising porous non-metallic combustion accelerating material filling said tube throughout part of its length, a perforated plug in said tube and means for directing through said plug into contact with said refractory material at such speed as to normally prevent back firing an explosive gaseous mixture of combustible gas and of supporter of combustion therefor in substantially the proportions required for complete combustion, to effect combustion within said incandescent refractory material.

18. A liquid heating apparatus comprising a reservoir, a tube in said reservoir, granular refractory material within part of said tube and means for directing into contact with said refractory material so as to normally prevent back firing an explosive gaseous mixture to effect combustion thereof within said incandescent refractory material.

19. A liquid heating apparatus comprising a receptacle, a body of refractory material comprising non-metallic combustion accelerating material, means for protecting said refractory material from contact with the liquid normally contained in said receptacle and means for directing into contact with said refractory material an explosive gaseous mixture of combustible gas and of supporter of combustion therefor in proportions allowing substantially complete combustion, to effect accelerated combustion adjacent said incandescent refractory material.

20. A liquid heating apparatus comprising a receptacle, a body of refractory combustion accelerating material, means for protecting said refractory material from contact with the liquid normally contained in said receptacle and means for directing into contact with said refractory material an explosive gaseous mixture of combustible gas and of supporter of combustion therefor to effect accelerated combustion adjacent said incandescent refractory material.

21. A heating apparatus comprising a reservoir, a tube in said reservoir, porous refractory combustion accelerating material in said tube and means for passing into said tube and directing into contact with said refractory material an explosive gaseous mixture of combustible gas and of supporter of combustion therefor in proportions allowing substantially complete combustion, to effect accelerated combustion adjacent said incandescent refractory material and to cool the heated combustion gases by passing the same into contact with additional refractory material.

22. A heating apparatus comprising a tube, said tube containing refractory material comprising non-metallic combustion accelerating material and means for directing into contact with said refractory material an explosive gaseous mixture to effect accelerated combustion adjacent said refractory material.

23. A heating apparatus comprising a tube, granular refractory material comprising porous non-metallic combustion accelerating material in said tube and means for directing into contact with said refractory material an explosive gaseous mixture of combustible gas and of supporter of combustion therefor in proportions allowing substantially complete combustion, to effect accelerated combustion adjacent said refractory material.

24. A heating apparatus comprising a tube, refractory material comprising non-metallic combustion accelerating material in said tube and means for feeding combustible gas and supporter of combustion therefor and forming therefrom an explosive gaseous mixture and bringing the same into contact with said refractory material to effect accelerated combustion of said explosive gaseous mixture.

25. A heating apparatus comprising a tube, refractory material comprising non-metallic combustion accelerating material in said tube, means for feeding combustible gas and supporter of combustion therefor and forming therefrom an explosive gaseous mixture and bringing the same into contact with said refractory material to effect accelerated combustion of said explosive gaseous mixture and means to cool the heated combustion gases by bringing them into contact with granular material.

26. A heating apparatus comprising a tube, refractory granular material comprising non-metallic porous combustion accelerating material in said tube, means for feeding combustible gas and supporter of combustion therefor and forming therefrom an explosive gaseous mixture and bringing the same into contact with said refractory material to effect the highly accelerated combustion of said explosive gaseous mixture, means to utilize heat from said combustion by transmission thereof through the material of said tube and means to cool the heated combustion gases by bringing them into contact with granular material.

27. A heating apparatus comprising a tube, granular refractory material comprising non-metallic combustion accelerating material in said tube, means for directing into contact with said refractory material an explosive gaseous mixture of combustible gas and of supporter of combustion therefor in proportions allowing substantially complete combustion, to effect accelerated combustion of said mixture adjacent said refractory material and means to utilize heat from said combustion by transmission thereof through the material of said tube and to simultaneously cool said refractory material in said tube.

28. A heating apparatus comprising a tube of heat-conducting material, granular refractory material of between about one-half and one inch mesh in said tube and comprising porous non-metallic combustion accelerating material, means for directing into contact with said refractory material an explosive gaseous mixture of combustible gas and of supporter of combustion therefor in proportions allowing substantially complete combustion, to effect accelerated combustion of said mixture adjacent said refractory material, and means to utilize heat from said combustion by transmission thereof through the material of said tube and to simultaneously cool said refractory material in said tube.

29. A heating apparatus comprising a tube, refractory material comprising non-metallic combustion accelerating material in said tube, means for feeding combustible gas and supporter of combustion therefor and forming therefrom an explosive gaseous mixture and bringing the same into contact with said refractory material to effect accelerated combustion of said explosive gaseous mixture, means to utilize heat from said combustion by transmission thereof through the material of said tube and means to cool the heated combustion gases by bringing them into contact with refractory material.

30. A heating apparatus comprising a tube of heat-conducting material, refractory material comprising non-metallic combustion accelerating material in said tube, means for feeding combustible gas and supporter of combustion therefor and forming therefrom an explosive gaseous mixture and bringing the same into contact with said refractory material to effect accelerated combustion of said explosive gaseous mixture and means to utilize heat from said combustion by transmission thereof through the material of said tube and to simultaneously cool said refractory material in said tube.

31. A heating apparatus comprising a tube of heat-conducting material, said tube containing refractory material comprising non-metallic combustion accelerating material, means for directing into contact with said refractory material an explosive gaseous mixture to effect accelerated combustion thereof adjacent said refractory material and means to utilize heat from said combustion by transmission thereof through the material of said tube and to simultaneously cool said refractory material in said tube.

32. A heating apparatus comprising a reservoir, a tube in said reservoir, granular refractory material comprising porous non-metallic combustion accelerating material in said tube and means for directing into contact with said refractory material an explosive gaseous mixture of combustible gas and of supporter of combustion therefor in proportions allowing substantially complete combustion, to effect accelerated combustion adjacent said refractory material.

33. A heating apparatus comprising a reservoir, a tube of heat-conducting material in said reservoir, granular refractory material of between about one-half and one inch mesh in said tube and comprising porous non-metallic combustion accelerating material and means for directing into contact with said refractory material an explosive gaseous mixture of combustible gas and of supporter of combustion therefor in proportions allowing substantially complete combustion, to effect accelerated combustion adjacent said refractory material.

34. A heating apparatus comprising a reservoir, a metallic tube in said reservoir, said tube containing refractory granular material and means for directing into contact with said refractory material an explosive gaseous mixture of combustible gas and of supporter of combustion therefor in substantially the proportions required for complete combustion to effect accelerated combustion adjacent said refractory material.

35. A heating apparatus comprising a metallic tube, said tube containing refractory material comprising non-metallic combustion accelerating material, means for directing an explosive gaseous mixture so as to prevent backfiring into contact with said refractory material to effect accelerated combustion of said gaseous mixture adjacent said refractory material and to utilize heat from said combustion by transmission thereof through the material of said tube.

36. A heating apparatus comprising a metallic tube, said tube containing refractory material comprising non-metallic combustion accelerating material, means for feeding combustible gas and supporter of combustion therefor and forming therefrom an explosive gaseous mixture and bringing the same into contact with said refractory material to effect accelerated combustion of said explosive gaseous mixture and to utilize heat from said combustion by transmission thereof through the material of said tube.

37. A heating apparatus comprising a tube of heat-conducting material, granular non-metallic refractory material in said tube, means for directing gaseous heating material into contact with said granular material to heat the same and means to utilize said heat by transmission thereof through the material of said tube and to simultaneously cool said granular material in said tube.

38. A heating apparatus comprising a reservoir, a tube of heat-conducting material in said reservoir, said tube being filled throughout part of its length with refractory granular material of between about one-half and one inch mesh, and means for supplying gaseous heating material thereto.

39. A boiler comprising a liquid reservoir, a tube extending therethrough, granular refractory material within said tube throughout part of its length and means for feeding combustible gas and supporter of combustion therefor and forming therefrom an explosive gaseous mixture and bringing the same into contact with said refractory material to effect accelerated combustion of said explosive gaseous mixture.

40. A boiler comprising a liquid reservoir, a tube extending therethrough, granular refractory material comprising non-metallic combustion accelerating material within said tube throughout part of its length and means for feeding combustible gas and supporter of combustion therefor and forming therefrom an explosive gaseous mixture and bringing the same so as to normally prevent back firing into contact with said refractory material to effect accelerated combustion of said explosive gaseous mixture.

41. A boiler comprising a liquid reservoir, a tube extending therethrough, refractory material comprising porous non-metallic combustion accelerating material within said tube throughout part of its length and means for feeding combustible gas and supporter of combustion therefor and forming therefrom an explosive gaseous mixture and bringing the same into contact with said refractory material to effect accelerated combustion of said explosive gaseous mixture.

42. A boiler comprising a reservoir, a plurality of tubes extending therethrough and containing refractory combustion accelerating material, means to supply an explosive gaseous mixture to said tubes and additional gas supplying means including a separate gas nozzle communicating with each of said tubes.

43. A boiler comprising a reservoir, a plurality of tubes extending into said reservoir, each of said tubes containing refractory combustion accelerating material, heads communicating with said tubes at one end thereof and connecting them together into groups, separate means for supplying an explosive gaseous mixture to each of said groups of tubes and additional means for supplying gas to each of said tubes.

44. A boiler comprising a reservoir, a plurality of tubes extending therethrough, each containing refractory combustion accelerating material and means including a separate gas nozzle coöperating with each of said tubes for supplying gaseous material thereto.

In witness whereof we have hereunto set our hands in the presence of two witnesses.

WILLIAM ARTHUR BONE.
JAMES WILLIAM WILSON.
CYRIL DOUGLAS McCOURT.

Witnesses:
CLIVE WAUGH,
CHARLES E. TAYLOR.